United States Patent [19]
Stewart et al.

[11] 3,871,820
[45] Mar. 18, 1975

[54] WOOL SCOURING

[75] Inventors: Rex George Stewart, Christchurch; Gerald Vivian Barker, Lincoln; John Leonard Hoare, Christchurch, all of New Zealand

[73] Assignee: Wool Research Organization of New Zealand (Inc.), Lincoln, Canterbury, New Zealand

[22] Filed: Aug. 17, 1973

[21] Appl. No.: 389,224

[30] Foreign Application Priority Data
Aug. 18, 1972 New Zealand.................... 168134

[52] U.S. Cl..................... 8/139, 68/18 D, 68/18 R, 68/22 R, 68/184, 68/208, 210/73, 210/152, 210/259
[51] Int. Cl............................................. D01c 3/00
[58] Field of Search.......... 68/19, 22 R, 18 C, 18 D, 68/18 R, 175, 184, 208; 8/139, 139.1; 210/71, 73, 152, 181, 258, 259

[56] References Cited
UNITED STATES PATENTS
| | | | |
|---|---|---|---|
| 1,920,469 | 8/1933 | Jones.............................. | 68/18 R X |
| 2,157,287 | 5/1939 | Furbush............................ | 68/18 D |
| 2,694,043 | 11/1954 | Jenks.............................. | 210/259 X |
| 3,398,093 | 8/1968 | Ferney............................. | 210/73 X |

*Primary Examiner*—Harvey C. Hornsby
*Assistant Examiner*—C. K. Moore

[57] ABSTRACT

The invention includes a method and apparatus for use in wool scouring operations and the treatment of the aqueous scouring liquids after and during use to extract recoverable lanolin or wool grease and heat from such liquids, and separate solid and extraneous matter from the liquids prior to discharge. The method and apparatus provides for removal of excess liquid from wool leaving a main scouring tank, passage of hot liquor and suspended solids from the wool and main scouring tank to a side tank, recycling of liquid from which solids have precipitated and passage of the solids to a heavy solids settling tank via a dump tank, removal of heavy solids precipitated in the settling tank and passage of the remaining liquid through a lanolin extractor; and recycling the remaining liquid or discharging all or part of such remaining liquid to waste via a heat exchanger which recovers heat from the discharge liquid for heating fresh water or liquid.

23 Claims, 1 Drawing Figure

PATENTED MAR 18 1975 3,871,820
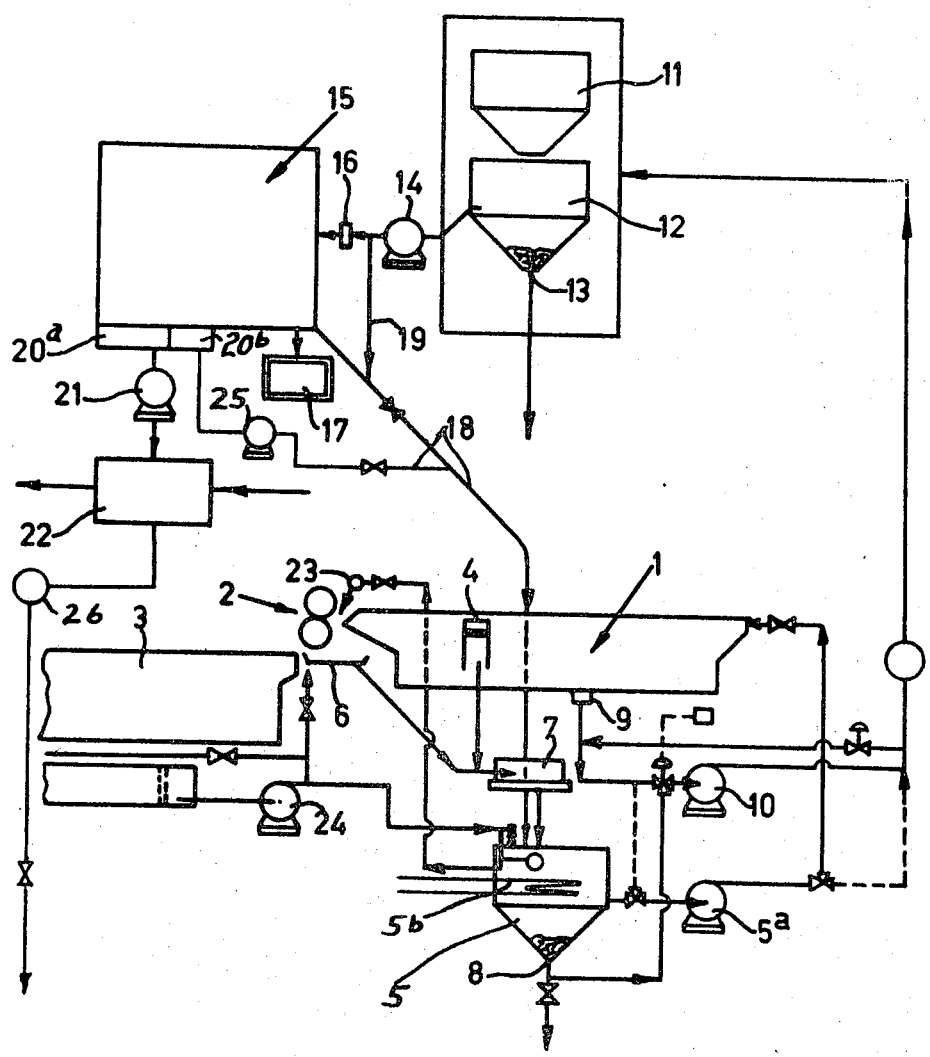

WOOL SCOURING

This invention relates to wool scouring, and more particularly relates to the recovery of lanolin from the scouring liquid after use, and the treatment of the liquid after use and prior to drainage as effluent.

In conventional wool scouring operations, wool is usually washed in a hot aqueous detergent solution in large rectangular tanks or bowls; there being at least one main scouring tank, but usually a series of such tanks, through which the wool is propelled. In such wool scouring operations, considerable quantities of heavy solids and dirt are removed from the wool together with wool grease or lanolin and suint (water soluble potassium salts of organic acids). Concentrations of these impurities rapidly build up, particularly in the first or main scouring tank or bowl and side tank, and, because of this, it is usually necessary to either use an automatic discharge system or to periodically stop scouring and empty all or part of this tank or bowl and the side tank to enable the wool to be scoured to a satisfactory level of cleanliness. Thus, in such conventional systems, there are discharges at regular or irregular intervals of highly polluting scouring liquors containing large quantities of dirt and some potentially recoverable lanolin; this, in turn, exacerbates the effluent treatment problem and has particular disadvantages in that:

a. It is necessary to provide pipelines and subsequent treatment apparatus which are required to be large enough to cope with peak discharges, whilst between such peaks the pipelines and treatment apparatus may not be used, b. Liquor is used to carry heavy solids and when flow slows down in pipelines or holding tanks, these solids settle out and the pipelines or tanks must be designed specifically for this so that removal is facilitated, the only alternative being the necessity to resort to costly cleaning procedures, c. Valuable recoverable lanolin is usually lost with these discharges, d. The scouring process is rendered non-uniform with the relatively slow build up, then rapid discharge of liquor containing solids with concomitant variation in the detersive capacity of the system, e. The discharges are usually hot and this heat energy cannot be conveniently or efficiently extracted because of the aforementioned heavy solids and some fibre present which would clog a heat exchanger and also because of the intermittent nature of the discharge, f. The process as conventionally operated does not allow for easily metered or recorded discharge rates so that positive control of water usage is difficult.

An object of this invention is to provide a method and apparatus avoiding these intermittent discharges of highly polluting scouring liquor and dirt into drainage systems and to permit only discharge into drainage systems of liquor which is far less polluting and void, or substantially void, of heavy solids, fibre, dirt and heat. In this form it is eminently suitable for further effluent treatment or byproduct recovery.

Another object of this invention is to obtain better control and increased uniformity of scouring, and to assist the scouring process by enabling more efficient use of wash waters than is usually the case, and to increase the recovery of lanolin from the wash waters and alleviate the effluent disposal problems by ensuring that additional lanolin, fibre, heavy solids and heat is removed from the scouring liquors before discharge is a uniform rate.

Other objects and advantages of the invention will become apparent from the ensuing description.

According to this invention therefore, there is provided apparatus for use in wool scouring operations comprising a scouring tank for containing hot aqueous cleansing solution into which wool to be scoured is passed, means for moving the wool to liquor removing means associated with the scouring tank and whereby excess liquor is removed from the wool leaving the scouring tank, a side tank for receiving overflow liquid and suspended solids from the scouring tank and liquid removed from wool leaving the scouring tank, means for re-cycling liquid from the side tank to the scouring tank, said scouring and side tanks having bottom outlets for heavy solids and from which the heavy solids can be passed to a heavy solids settling tank, said solids settling tank having an outlet for the discharge of solids and an outlet in communication with lanolin extraction recovery plant whereby lanolin is recovered from liquid from the solids settling tank to leave liquid for re-cycling to the scouring tank and/or drainage.

Further according to this invention, there is provided a method of processing aqueous scouring liquids after and during use in wool scouring operations and before drainage or discharge, comprising the steps of passing hot liquor and suspended solids from a main scouring tank and removed from wool leaving the scouring tank into a side tank, allowing heavy solids to precipitate in the scouring and side tanks, re-cycling liquid from the side tank to the scouring tank and passing liquor containing heavy solids from the scouring and side tanks to a heavy solids settling tank, allowing the heavy solids to precipitate in the settling tank for subsequent discharge, and passing liquid from the settling tank to an extractor whereby lanolin is extracted from the liquid, the remaining liquid being re-cycled to the scouring tank and/or passed to drainage.

The invention is particularly concerned with the first stages of wool scouring where the major part of heavy solids, dirt, wool grease or lanolin and suint are removed from the wool, and one preferred aspect of the invention will now be described by way of example and with reference to the accompanying drawing which is a general flow diagram of the main stage of wool scouring operations in accordance with the invention.

The main or first scouring tank or bowl 1 may be of conventional generally elongate rectangular form and with associated wool moving means such as rakes whereby the wool is urged towards one end of the tank 1 in the hot aqueous detergent solution and to a set of heavy duty squeeze rollers 2 at the said tank end and whereby excess liquid is squeezed from the wool as the wool leaves the main scouring tank 1 and passes to the next scouring tank 3 of the series.

The main scouring tank 1 is provided with an overflow outlet 4 and whereby excess liquids in the main scouring tank 1 may pass to the side tank 5, and a trough or like receptacle 6 below the squeezing rollers 2 is arranged to pass liquid squeezed from the wool also to the side tank 5. Preferably the flow of liquid from the overflow outlet 4 and squeeze rolls trough 6 is by way of a self cleaning flock catcher or sieve 7 so that liquid free from flock is passed to the side tank 5, alternatively overflow may bypass the flock catcher 7 and pass directly to the side tank 5.

The side tank 5 preferably has a hopper shaped bottom section with a bottom outlet 8 for heavy solids which may precipitate from the liquid in the side tank 5. The side tank 5 may also contain heating coils 5b to enable the liquid to be raised to and maintained at suitable elevated temperatures. The main scouring tank or bowl 1 may also be provided with a hopper bottom or hopper bottoms and/or provided at its base with a screw or worm device to collect heavy solids precipitating from the liquor in the scouring tank 1 and feed or move such solids to an outlet 9 in tank 1. Both heavy solids discharge outlets 9 and 8 of the scouring and side tanks 1 and 5 are placed under suction by a heavy solids pump 10 and have communicating pipelines to a first hopper like storage or dump tank 11 or directly to a heavy solids settling tank 12 (also of hopper like formation) which is equipped with baffles to facilitate the settling out of heavy solids. Liquid from the upper part of the tank 5 is returned to the end of the main scouring tank 1 by a side tank pump 5a.

The storage tank 11 is arranged to feed liquor and solids into the suitably baffled heavy solids settling tank 12. During normal operation liquor containing solids is fed by the heavy solids pump 10 directly into the heavy solids tank 12. In the event of bowl 1 or side tank 5 needing to be replenished with clean water, their contents can be pumped by means of the heavy solids pump 10 or the side tank pump 5a into the dump tank 11 which then feeds directly into the heavy solids tank 12 under level control.

To assist in causing flocculation and/or settlement of solids a flocculant such as aluminium suphate or a suitable organic polymer e.g., of the polyacrylamide kind, can be injected into the liquor at or before entering the heavy solids tank 12. Heavy solids may be discharged from an outlet 13 at the base or apex of the settling tank 12 in the form of a wet slurry and, in this form, such solids are suitable for dumping as fill since they are comprised mainly of inorganic material. Alternatively this slurry can be further treated so as to remove water (such as passage through a centrifuge of the horizontal decanter kind) to make it even more suitable for disposal as landfill. Liquid free or substantially free from settleable solids is drawn from the upper part of the settling tank 12 by way of a feed pump 14 which feeds the drawn off liquid to a lanolin extraction plant 15 by way of a feed heater 16 which is heated such as by a steam supply, the lanolin extraction or recovery plant 15 being of the kind including a nozzle centrifuge (such as of the kind commonly used in the industry as a first stage lanolin recovery unit) or another kind of centrifuge.

Product lanolin 17 from the recovery plant 15 is retained and all or part of the liquid discharge from the first stage recovery plant 15 is discharged to waste in a controlled fashion via a surge tank 20a, the flowdown pump 21, a heat exchanger 22 and flowmeter 26 whilst any remaining liquid may be re-cycled by way of a second surge tank 20b, a recycle pump 25 and pipe 18 to the side tank 5. By-pass means 19 may be interposed between the feed pump 14 and feed heater 16 so that if necessary or desired, for example if the centrifuge is not being operated, all or part of the liquid may by-pass also the lanolin recovery plant 15 and be directed via pipe 18 to the side tank 5 for re-cycling or with part being discharged to waste via the surge tank 20a, pump 21, heat exchanger 22 and flowmeter 26.

The nozzle discharge and middle discharge from the lanolin recovery unit feed into the surge tanks 20a and 20b respectively, which are preferably float controlled with recycle provision to prevent the pumps 21 and 25 from running dry. In addition the recycle pump 25 has facility for passing some of its flow to the surge tank 20a on float control demand. The contents of surge tank 20a are pumped to waste by the flowdown pump 21 preferably via the heat exchanger 22 and flowmeter 26 whereby heat from the waste liquid is recovered by heat transfer to clean water or cleaning liquid for subsequent washing tanks or bowls in the series forming the complete apparatus. The balance of liquid remaining in surge tank 20b is recycled via recycle pump 25 and line 18 to the side tank 5.

A counter current flow of liquid for the main scouring tank 1 may be provided by a liquid jet distributor 23 at the wool outlet end of the main scouring tank 1 and which is fed by flow back liquid pumped by way of a flow back pump 24 from the second or next scouring tank or bowl 3. Thus true counterflow is obtained and carryover of liquid from the main scouring tank or bowl 1 to the second scouring tank or bowl 3 is discouraged. The "flowback" may be initiated solely by the nozzle discharge or by the nozzle and part or all of the middle discharge to waste from the lanolin recovery unit 15 and by way of float controlled valves in the side tank 5.

The apparatus may include further appropriate by-pass and control valves and meters for draining and cleaning or servicing various sections of the apparatus.

By way of examples, the following data was obtained by operation of the scouring method and apparatus of this invention:

EXAMPLE 1

New Zealand crossbred fleece wool of 48s quality was scoured at the rate of eight bales of greasy wool (approx. 1,200 kg) per hour through a 1.8m wide five bowl scouring train. The temperatures in bowls 1 and 2 were 62°C and 61°C respectively with nonionic detergent being metered continuously into bowls 2 and 3 at the rate of one litre per hour. Liquor containing heavy solids was being continuously drawn from the bottom bowl 1, and its side settling tank at the rate of 4,461 litres per hour and delivered into a heavy solids tank, containing baffles to facilitate settling. Sludge was being drawn from the bottom of this tank by means of a pneumatically operated pinch valve actuated by a timer so that it opened for 7 seconds every 6 minutes. Flow rates and analysis of liquor and sludge were as follows:

|  | FLOW RATE | TOTAL SOLIDS | DIRT | GREASE |
| --- | --- | --- | --- | --- |
|  | Ltrs/hr. | % By Wt. | % By Wt. | % By Wt. |
| Into heavy solids tank | 4461 | 5.52 | 1.11 | 1.49 |
| Sludge discharge | 91 | 24.51 | 20.91 | 1.63 |

Settled liquor from the heavy solids tank at 60°C was pumped to a nozzle centrifuge (Alfa Laval type FVK4) fitted with 1.15mm sapphire lined jets. After passage through the machine three streams were produced:

1. Cream phase, rich in wool grease,

2. A middle phase depleted in grease with respect to the feed,
3. A jet phase depleted in grease but richer in dirt with respect to the feed. The flow rates and analyses of the four streams were as follows:

|  | FLOW RATE | TOTAL SOLIDS | DIRT | GREASE |
|---|---|---|---|---|
|  | Ltrs/hr. | % By Wt. | % By Wt. | % By Wt. |
| Feed to FVK4 centrifuge | 4370 | 5.02 | 0.68 | 1.45 |
| Cream discharge | 34 | 66.40 | — | 66.40 |
| Middle discharge | 2974 | 4.52 | 0.65 | 1.07 |
| Jet discharge | 1362 | 4.89 | 0.74 | 1.19 |

The recovery rate of anhydrous woolgrease was calculated to be 22.6 kg/hour at a recovery efficiency of 36 percent. The flowdown to waste was adjusted to be 2,043 Litres per hour which included all the jet discharge and 681 Litres per hour of the middle discharge. This was piped to waste via a heat exchanger (Rosenblad spiral type supplied by Alfa-Laval) entering the exchanger at 60° and leaving at 24°C. A flow of clean water at the rate 2,600 litres per hour was heated from 15°C to 42.7°C. Data from a conventional New Zealand scour indicated that discharge of heavy scour liquid was usually at a rate of approx. 5 litres per kg of greasy wool while in this example the flowdown rate was 1.7 litres per kg of greasy wool.

EXAMPLE 2

The wool being scoured was New Zealand crossbred fleece of 48s quality through the same plant and at the same rate as for Example 1. Liquor containing heavy solids was drawn continuously from the bottom of bowl 1 and its side settling tank and delivered to the heavy solids tank at the rate of 6,084 litres per hour. Settled solids and liquor was drawn off continuously from the sludge discharge point of the heavy solids tank at the rate of 1,725 litres per hour and passed through a desludger of the horizontal decanter type with a screw facility for the continuous removal of deposited solids (Alfa-Laval type NX 207) and recycled to the side tank. A semi-dry solid was ejected which gave on analysis a dry solids content of 67 percent by weight. Analysis of samples of the liquor flowing to and from the decanter gave the following results:

|  | TOTAL SOLIDS | DIRT | GREASE |
|---|---|---|---|
|  | % By Wt. | % By Wt. | % By Wt. |
| Into decanter | 12.44 | 7.11 | 2.23 |
| Out of decanter | 7.79 | 2.02 | 2.31 |

Samples were drawn of the feed to the heavy solids tank and the settled liquor going from the heavy solids tank to the lanolin plant. One litre aliquots of these were settled for 15 minutes in Imhoff cones, the bottom 100 ml drawn off and centrifuged in a laboratory centrifuge. The supernatent was discarded and the wet compacted sludge weighed as below:

|  | Wt. of wet sludge |
|---|---|
| Into heavy solids tank | 14.93 g |
| Out of heavy solids tank | 3.35 g |

The results illustrated the removal of settleable solids by the heavy solids tank. Flow rates and analyses into and out of the nozzle centrifuge were as follows:

|  | FLOW RATE | TOTAL SOLIDS |
|---|---|---|
|  | Litres/hour | % By Weight |
| Feed to FVK4 Centrifuge | 4358 | 5.13 |
| Cream discharge | 27 | 79.20 |
| Middle discharge | 2906 | 4.60 |
| Jet discharge | 1425 | 4.94 |

Wool grease recovery was at a rate of 21.6 kg/hour with an efficiency of 40 percent.

EXAMPLE 3.

New Zealand crossbred fleece wool was being scoured at the rate of six bales of greasy wool (approx. 900 kg/hour). Temperatures in bowls 1 and 2 were 63° and 56°C respectively with neutral nonionic detergent being metered into bowls 3 and 2 at the rate of 1 litre and 0.8 litres per hour respectively. Liquor containing heavy solids was being drawn continuously from the bottom of bowl 1 and its side tank and pumped to the heavy solids tank at the rate of 4,606 litres/hour. At the point of entry into the heavy solids tank a 0.1% (by weight) solution of a flocculant of the polyacrylamide type was injected at such a rate as to give a concentration of 10 mg/litre of the flocculant on the incoming liquor. Sludge was discharged from the bottom of the heavy solids tank by arranging for the automatic timer to open the pinch valve for 8 seconds every 5 minutes. This gave a sludge discharge rate of 133 litres per hour. Data for the feed to the heavy solids tank and the sludge discharge were as follows:

|  | FLOW RATE | TOTAL SOLIDS | DIRT | GREASE |
|---|---|---|---|---|
|  | Ltrs/hr. | % By Wt. | % By Wt. | % By Wt. |
| Feed to heavy solids tank | 4606 | 8.74 | 2.34 | 2.35 |
| Sludge discharge | 133 | 34.99 | 30.30 | 2.46 |

Settled liquor was drawn off continuously from the top of the heavy solids tank and pumped to the nozzle centrifuge. The feed rate and analyses to and from this centrifuge were as follows:

|  | FLOW RATE | TOTAL SOLIDS | DIRT | GREASE |
|---|---|---|---|---|
|  | Ltrs/hr. | % By Wt. | % By Wt. | % By WT. |
| Feed to FVK4 centrifuge | 4473 | 7.78 | 1.40 | 2.22 |
| Cream discharge | 64 | 65.90 | 8.30 | 58.60 |
| Middle discharge | 3028 | 6.64 | 0.80 | 1.58 |
| Jet discharge | 1381 | 7.81 | 2.22 | 1.54 |

Recovery of anhydrous woolgrease was at the rate of 26.6 kg/hour with an efficiency of 33 percent. The flowdown of liquor from the system via the heat exchanger was at the rate of 1,589 litres/hour comprising all of the jet discharge plus 208 litres/hour of the middle discharge. This corresponded to 1.76 litres per kg of greasy wool being scoured.

In all three examples, since too the amount of flowdown was substantially less than the amount of liquor passed through the nozzle centrifuge, the major part of the discharge was returned to the scour where it could ultimately be returned to the centrifuge for further recovery. The recovery efficiencies given in all three examples refer therefore to the "spot" or instantaneous recovery which could be significantly less than the actual recovery if recycling was taken into consideration. The formulae used for determining recovery efficiency in the three examples was Amount of woolgrease actually recovered/Amount in feed to centrifuge 100/1. In addition because of the steady rate of discharge of liquor to waste in this way, the levels in all the scouring bowls remained constant and there was no "surging" with concomitant flow to drain of liquor from the intermediate bowls.

At any convenient or suitable stages in the process of this invention, suitable additives, such as butanol or other organic alcohols, acids or salts, can be added to the scouring liquors to reduce the stability of the emulsion and facilitate the separation and settling of solids and facilitate the recovery of woolgrease.

A particular form of the invention has been described by way of example, but it will be appreciated that other variations of and modifications to the invention can take place without departing from the scope of the appended claims.

We claim:

1. Apparatus for use in wool scouring operations comprising a scouring tank for containing hot aqueous cleansing solution into which wool to be scoured is passed, means for moving the wool to liquor removing means associated with the scouring tank and whereby excess liquor is removed from the wool leaving the scouring tank, a side tank for receiving overflow liquid and suspended solids from the scouring tank and liquid removed from wool leaving the scouring tank, means for recycling liquid from the side tank to the scouring tank, said scouring and side tanks having bottom outlets for heavy solids and from which the heavy solids can be passed to a heavy solids settling tank, said solids settling tank having an outlet for the discharge of solids and an outlet in communication with lanolin extraction or recovery plant whereby lanolin is recovered from liquid from the solids settling tank to leave liquid for recycling to the scouring tank and/or drainage.

2. Apparatus as claimed in claim 1 wherein the liquor removing means comprises squeeze rolls through which the wool is passed and whereby excess liquor is squeezed from the wool for transfer to the side tank.

3. Apparatus as claimed in claim 1 wherein a dump tank is provided in juxtaposition with the heavy solids settling tank, the dump tank being arranged to receive the liquor and solids from the scouring and side tanks and subsequently discharge its contents to the settling tank as required.

4. Apparatus as claimed in claim 1 wherein the scouring tank is provided at its base with a screw or worm solids collection and feed device for feeding precipitated solids to the scouring tank outlet.

5. Apparatus as claimed in claim 1 wherein a heating means is provided between the settling tank and the lanolin extraction or removal plant for heating liquid passed to such plant.

6. Apparatus as claimed in claim 1 wherein a centrifuge of the horizontal decanter kind is provided for receiving solids discharged from the settling tank and removing water from such solids.

7. Apparatus as claimed in claim 1 wherein the lanolin extraction or recovery plant is of the centrifugal kind.

8. Apparatus as claimed in claim 7 wherein the lanolin extraction or recovery plant includes a nozzle centrifuge.

9. Apparatus as claimed in claim 1 wherein a surge tank is provided to receive at least part of the liquid discharged from the lanolin plant and to pass such received liquid to a flow-down pump, there being a heat exchanger to receive liquid from the flow-down pump and heat clean or cleaning liquid for use in the apparatus.

10. Apparatus as claimed in claim 9 wherein a second surge tank is provided to receive part of the liquid discharged from the lanolin plant for recycling by way of a recycle pump feeding the side tank.

11. Apparatus as claimed in claim 1 wherein means are provided at the wool removal part or end of the scouring tank to effect a counter current flow of liquid in the scouring tank and prevent or discourage a carry-over of liquid from the scouring tank to a next scouring tank of a series arranged in juxtaposition with and arranged to receive wool from the first or main scouring tank.

12. Apparatus as claimed in claim 11 wherein the counter current flow of liquid for the scouring tank is provided by a liquid jet distributor at the wool removal part or end of the scouring tank, and which jet distributor is fed by flow back liquid pumped by way of a flow back pump from the next scouring tank.

13. Apparatus as claimed in claim 1 wherein the side tank is provided with heating means for its contents.

14. A method of processing aqueous scouring liquids after and during use in wool scouring operations and before drainage or discharge, comprising the steps of passing hot liquor and suspended solids from a main scouring tank and removed from wool leaving the scouring tank into a side tank, allowing heavy solids to precipitate in the scouring and side tanks, recycling liquid from the side tank to the scouring tank and passing liquor containing heavy solids from the scouring and side tanks to a heavy solids settling tank, allowing the heavy solids to precipitate in the settling tank for subsequent discharge, and passing liquid from the settling tank to an extractor whereby lanolin is extracted from the liquid, the remaining liquid being recycled to the scouring tank and/or passed to drainage.

15. A method as claimed in claim 14 and including the further step of passing liquor and solids from the side and scouring tanks to a dump tank, from which dump tank the liquor and solids are fed to the settling tank.

16. A method as claimed in claim 14 wherein excess liquor is removed from wool leaving the scouring tank by means of squeeze rollers.

17. A method as claimed in claim 14 wherein liquid discharged from the lanolin extractor is utilised to provide heat by way of a heat exchanger for clean or cleaning liquid for use in or on apparatus for performing the method of this invention.

18. A method as claimed in claim 14 wherein a flocculant is added to the liquor and solids passing or passed to the settling tank.

19. A method as claimed in claim 18 wherein the flocculant is aluminium suphate.

20. A method as claimed in claim 18 wherein the flocculant is an organic polymer such as of the polyacrylamide kind.

21. A method as claimed in claim 14 wherein slurry discharged from the settling tank is subjected to treatment by a centrifuge of the horizontal decanter kind to remove liquid from such slurry.

22. A method as claimed in claim 14 wherein liquid from the settling tank is heated prior to being passed to the lanolin extractor.

23. A method as claimed in claim 14 wherein liquor in the scouring tank is subjected to counter current flow means at the wool removal part or end to prevent or discourage carryover of liquor from the scouring tank to a next scouring tank of a series.

* * * * *